United States Patent [19]
Eichelberger

[11] Patent Number: 5,881,503
[45] Date of Patent: Mar. 16, 1999

[54] DECORATIVE WINDOW WELL

[76] Inventor: Michael Eichelberger, 906 E. 440 North, Springville, Utah 84663

[21] Appl. No.: 911,560

[22] Filed: Aug. 14, 1997

[51] Int. Cl.[6] .................................................. E04F 17/06
[52] U.S. Cl. ............................... 52/107; 52/201; 52/202; 47/40; 47/68; 47/41.01
[58] Field of Search ............................ 52/107, 201, 202, 52/473, 656.7; 47/67, 68, 83, 40, 41.01, 41.12, 44

[56] References Cited

U.S. PATENT DOCUMENTS

| | | | |
|---|---|---|---|
| 248,519 | 10/1881 | Snyder | 47/41.01 |
| 2,162,628 | 6/1939 | Martin | 52/107 |
| 3,048,900 | 8/1962 | Slade | 52/107 |
| 3,099,900 | 8/1963 | Beck | 52/107 |
| 4,499,688 | 2/1985 | Droll | 47/83 |
| 4,704,828 | 11/1987 | Kemp | 52/107 |
| 4,876,833 | 10/1989 | Gefroh et al. | 52/107 |
| 4,896,456 | 1/1990 | Grant | 47/67 |
| 4,896,467 | 1/1990 | McGinnis | 52/107 |
| 5,085,002 | 2/1992 | Lee et al. | 47/41.12 |
| 5,107,640 | 4/1992 | Gefroh et al. | 52/107 |
| 5,339,579 | 8/1994 | Woodyer et al. | 52/107 |

*Primary Examiner*—Carl D. Friedman
*Assistant Examiner*—Winnie S. Yip

[57] ABSTRACT

A decorative window well is provided with a plurality of planters coupled to the window well for supporting plants. The planters define a plurality of rows comprising a bottom row including a single planter, an intermediate row including a pair of planters, and a top row including more than two planters. The window well further has an arcuate lip integrally coupled to a top face thereof.

4 Claims, 1 Drawing Sheet

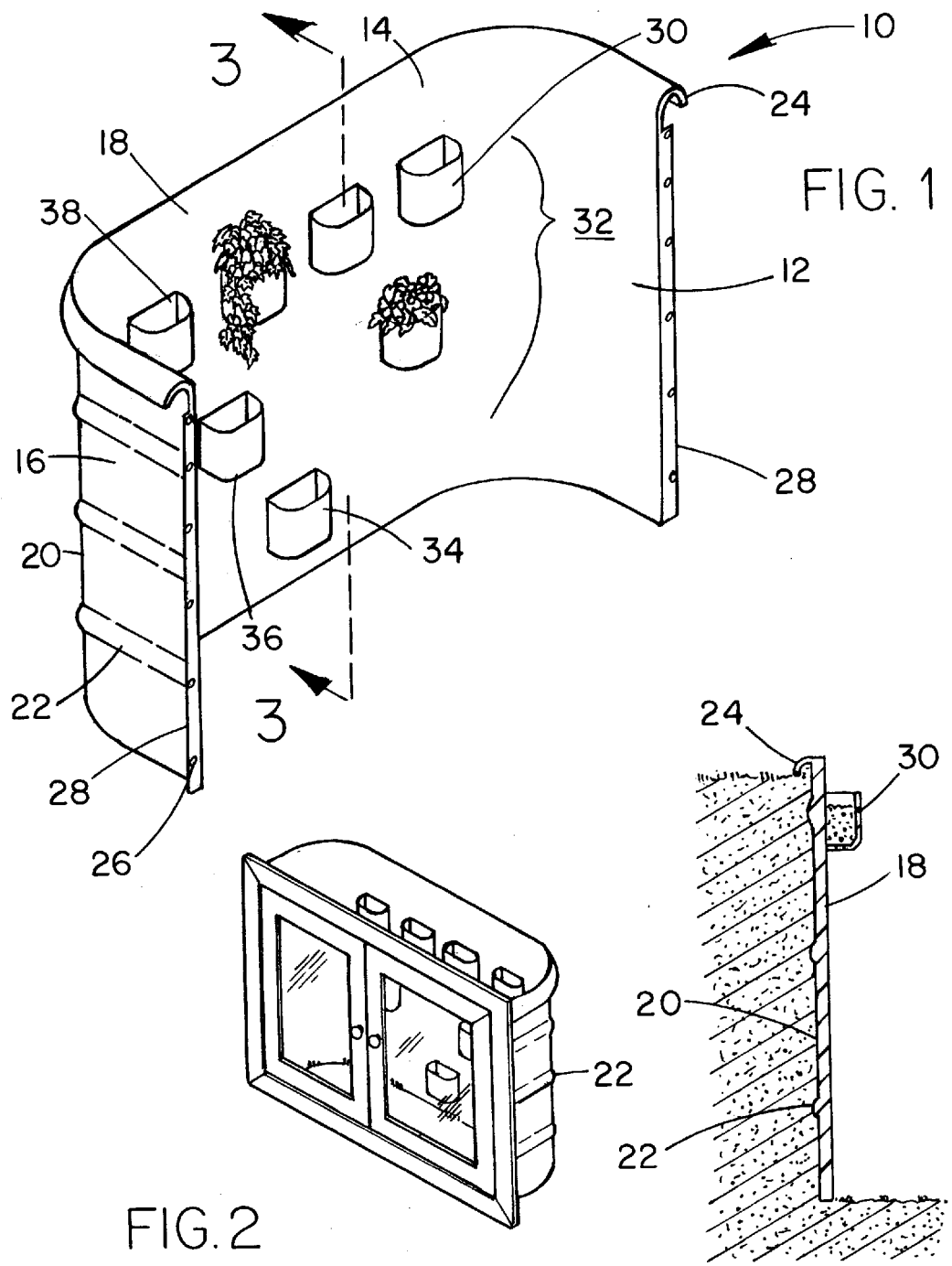

DECORATIVE WINDOW WELL

BACKGROUND OF THE INVENTION

1. Field of the Invention

The present invention relates to window wells and more particularly pertains to a new decorative window well for both improving the aesthetics of a window well and further providing a means of scaling the same.

2. Description of the Prior Art

The use of window wells is known in the prior art. More specifically, window wells heretofore devised and utilized are known to consist basically of familiar, expected and obvious structural configurations, notwithstanding the myriad of designs encompassed by the crowded prior art which have been developed for the fulfillment of countless objectives and requirements.

Known prior art window wells include U.S. Pat. No. 3,999,334; U.S. Pat. No. 4,896,467; U.S. Pat. Des. 248,071; U.S. Pat. No. 5,107,640; U.S. Pat. No. 4,704,828; and U.S. Pat. No. 4,876,833.

In these respects, the decorative window well according to the present invention substantially departs from the conventional concepts and designs of the prior art, and in so doing provides an apparatus primarily developed for the purpose of improving the aesthetics of a window well and further providing a means of scaling the same.

SUMMARY OF THE INVENTION

In view of the foregoing disadvantages inherent in the known types of window wells now present in the prior art, the present invention provides a new decorative window well construction wherein the same can be utilized for improving the aesthetics of a window well and further providing a means of scaling the same.

The general purpose of the present invention, which will be described subsequently in greater detail, is to provide a new decorative window well apparatus and method which has many of the advantages of the window wells mentioned heretofore and many novel features that result in a new decorative window well which is not anticipated, rendered obvious, suggested, or even implied by any of the prior art window wells, either alone or in any combination thereof.

To attain this, the present invention generally comprises a window well with a generally planar front wall and a pair of generally planar side walls with an arcuate interconnection therebetween. The window well has a smooth interior surface and an exterior surface equipped with a plurality of spaced strengthening ribs integrally coupled thereto. As best shown in FIG. 3, an upper edge of the window well has an arcuate lip integrally coupled thereto and extending outwardly therefrom. The lip ideally has an inverted U-shaped cross-section. In use, the side walls may be mounted to a building with the interior surface of the front wall of the window well facing a window thereof. Next provided is a plurality of planters each having a planar rear face, a planar front face, a planar bottom face with a pair of planar side faces coupled therebetween thereby defining an interior space and an open top. An interconnection between the front face and the side faces has an arcuate cross-section. Further, the rear face is perpendicularly situated with respect to the side faces. By this structure, a plant may be situated within the interior space of each of the planters. The planters each have the rear face thereof coupled to the interior surface of the planar front wall of the window well. As shown in FIG. 1, the planters define a plurality of rows comprising a bottom row including a single planter, an intermediate row including a pair of planters, and a top row including more than two planters.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative window well apparatus and method which has many of the advantages of the window wells mentioned heretofore and many novel features that result in a new decorative window well which is not anticipated, rendered obvious, suggested, or even implied by any of the prior art window wells, either alone or in any combination thereof.

It is another object of the present invention to provide a new decorative window well which may be easily and efficiently manufactured and marketed.

It is a further object of the present invention to provide a new decorative window well which is of a durable and reliable construction.

An even further object of the present invention is to provide a new decorative window well which is susceptible of a low cost of manufacture with regard to both materials and labor, and which accordingly is then susceptible of low prices of sale to the consuming public, thereby making such decorative window well economically available to the buying public.

Still yet another object of the present invention is to provide a new decorative window well which provides in the apparatuses and methods of the prior art some of the advantages thereof, while simultaneously overcoming some of the disadvantages normally associated therewith.

Still another object of the present invention is to provide a new decorative window well for improving the aesthetics of a window well and further providing a means of scaling the same.

Even still another object of the present invention is to provide a new decorative window well that includes a plurality of planters coupled to the window well for supporting plants.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new decorative window well according to the present invention.

FIG. 2 is a perspective view of the present invention is use.

FIG. 3 is a cross-sectional view of the present invention taken along line 3—3 shown in FIG. 1.

DESCRIPTION OF THE PREFERRED EMBODIMENT

With reference now to the drawings, and in particular to FIGS. 1 through 3 thereof, a new decorative window well embodying the principles and concepts of the present invention and generally designated by the reference numeral 10 will be described.

The system of the present invention designated as numeral 10 includes a window well 12 with a generally planar front wall 14 and a pair of generally planar side walls 16 with an arcuate interconnection therebetween. The window well has a smooth interior surface 18 and an exterior surface 20 equipped with a plurality of spaced strengthening ribs 22 integrally coupled thereto. Preferably, the interior surface is colored and textured to simulate a brick wall, granite or the like. As best shown in FIG. 3, an upper edge of the window well has an arcuate lip 24 integrally coupled thereto and extending outwardly therefrom. The lip ideally has an inverted U-shaped cross-section.

In use, the side walls may be mounted to a building with the interior surface of the front wall of the window well facing a window thereof. To facilitate such mounting, a plurality of linearly aligned bores 26 are formed in a pair of lips 28 which extend from interior edges of the side walls of the window well.

Next provided is a plurality of planters 30 each having a planar rear face, a planar front face, a planar bottom face with a pair of planar side faces coupled therebetween thereby defining an interior space and an open top. An interconnection between the front face and the side faces has an arcuate cross-section. Further, the rear face is perpendicularly situated with respect to the side faces. By this structure, a plant may be situated within the interior space of each of the planters. In the preferred embodiment, both the window well and the planters are constructed from high strength plastic.

The planters each have the rear face thereof coupled to the interior surface of the planar front wall of the window well. As shown in FIG. 1, the planters define a plurality of rows 32 comprising a bottom row 34 including a single planter, an intermediate row 36 including a pair of planters, and a top row 38 including four planters. The unique configuration of the planters thus serve not only to improve the aesthetics of the window well, but also to provide a means of scaling the window well in case of an emergency. The arcuate lip further facilitates such escape by providing a gripping area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative window well comprising, in combination:
   a window well including a generally planar front wall and a pair of generally planar side walls with an arcuate interconnection therebetween, the window well having a smooth interior surface and an exterior surface equipped with a plurality of spaced strengthening ribs integrally coupled thereto and extending therefrom and an upper edge having an arcuate lip integrally coupled thereto and extending outwardly therefrom wherein the lip has an inverted U-shaped cross-section, whereby the side walls may be mounted to a building with the interior surface of the front wall of the window well facing a window thereof; and
   a plurality of planters each having a planar rear face, a planar front face, a planar bottom face with a pair of planar side faces coupled therebetween thereby defining an interior space and an open top wherein an interconnection between the front face and the side faces has an arcuate cross-section and the rear face is perpendicularly situated with respect to the side faces, whereby a plant may be situated within the interior space of each of the planters;
   said planters each having the rear face thereof coupled to the interior surface of the planar front wall of the window well, the planters defining a plurality of rows comprising a bottom row including a single planter, an intermediate row including a pair of planters, and a top row including more than two planters.

2. A decorative window well comprising:
   a single piece window well having a substantially planar front wall; and
   a plurality of planters projecting outwardly from the planar front wall of the window well for supporting plants;
   wherein said planters define a plurality of rows comprising a bottom row including a single planter, an intermediate row including a pair of planters, and a top row including more than two planters;

wherein the window well has an arcuate upper edge with an inverted U-shaped cross-section.

3. A decorative window well as set forth in claim 2 wherein each planter includes a front face, a bottom face and a pair of side faces.

4. A decorative window well as set forth in claim 3 wherein the side faces of each planter has a height equal to that of the front face.

* * * * *